Figure 1:
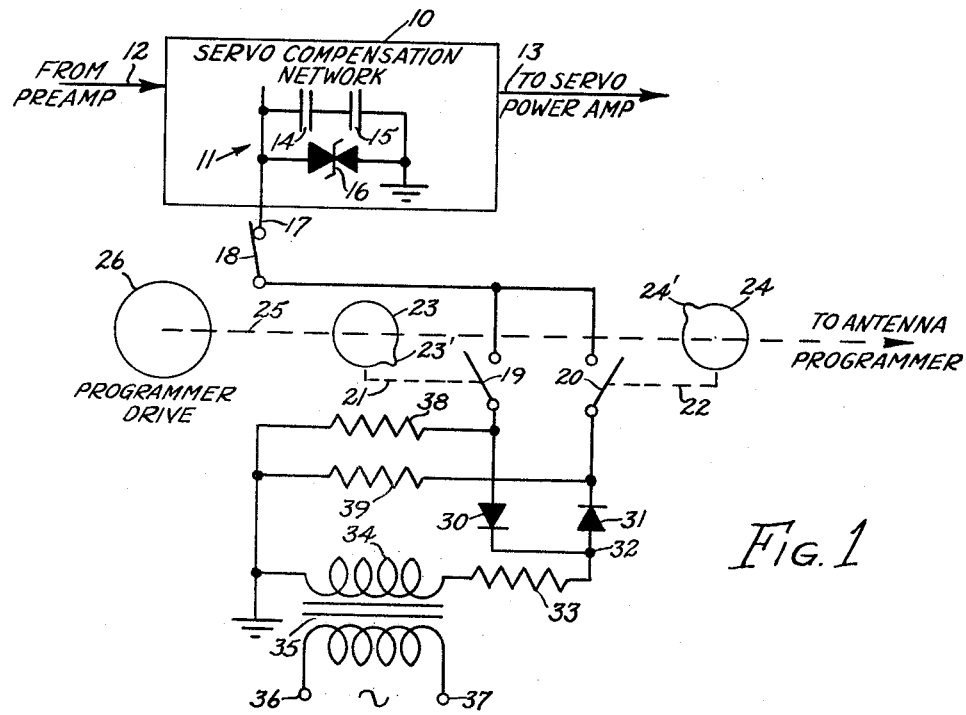

Jan. 19, 1965

A. JANSONS 3,166,704

SERVO MECHANISM TRANSIENT AND VELOCITY
ERROR COMPENSATION MEANS
Filed March 22, 1961

INVENTOR.
ARNOLDS JANSONS

BY

H. H. Losch
ATTORNEYS

United States Patent Office 3,166,704
Patented Jan. 19, 1965

3,166,704
SERVO MECHANISM TRANSIENT AND VELOCITY ERROR COMPENSATION MEANS
Arnolds Jansons, Indianapolis, Ind., assignor to the United States of America as represented by the Secretary of the Navy
Filed Mar. 22, 1961, Ser. No. 97,705
1 Claim. (Cl. 320—1)
(Granted under Title 35, U.S. Code (1952), sec. 266)

The invention described herein may be manufactured and used by or for the Government of the United States of America for governmental purposes without the payment of any royalties thereon or therefor.

This invention relates to electric switching means and more particularly to switch means for periodically charging and discharging a lag-lead servo system capacitor component of a servo compensation network for the purpose of reducing the reversing transient and velocity errors of a servoed radar antenna operative with a searching and tracking radar system.

In the better known radar antenna servo tracking and searching systems, the servo compensation selected has been a compromise between the two modes of operation of searching and tracking. As a result, the high velocity constants desired for target tracking were not obtainable without an increase of transient errors in the search mode. Another means using feed forward for servo compensation requires an additional network or a tachometer generator means which, for alternating current servo systems, is not very convenient. In these older means of servo compensation, either sacrifices in performance had to be made by compromise between the search and track modes of operation or additional cumbersome networks and components were necessary.

In a radar antenna servo system where high accuracies are required in the searching mode as well as the tracking mode, a lag-lead servo compensation network is used to obtain high velocity constants in the tracking mode of operation. In the searching mode of operation the transient errors are high after the change of direction of the antenna due to the long time constant of the lag-lead servo compensation network. These large transient errors can be reduced by applying a direct current pulse of appropriate polarity and duration to the lag-lead capacitor means of the servo compensation network at times when the antenna is at the end limits of its scanning motion. These direct current voltages will speed up the discharge and charge, or the change in charge, of the lag-lead capacitor means to aid the charging voltages resulting from change in antenna direction of scan. This is accomplished by utilizing the same programmer drive motive means that drives the antenna programmer of the search-track radar to program the actuator of a switching means to apply direct current voltages of appropriate polarity to the servo compensation lag-lead capacitor means at the extreme limits of the antenna scanning positions. The switching means must be of the type to switch between inputs of voltage of opposite polarity. This voltage source may be rectified alternating current or separate sources of direct current. The program switching means may have, in addition, a mode switch in the output to the servo compensation lag-lead capacitor means to program the application of positive and negative direct current voltages only during one mode of operation, preferably in the search mode. It is therefore a general object of this invention to provide a servo compensation network programmer comprising a switching means actuated by a radar antenna programmer drive system to alternately apply positive and negative direct current voltages to the servo compensation lead-lag capacitor component for the purpose of reducing transient and velocity errors in the searching mode of operation of the radar.

Figure 2:
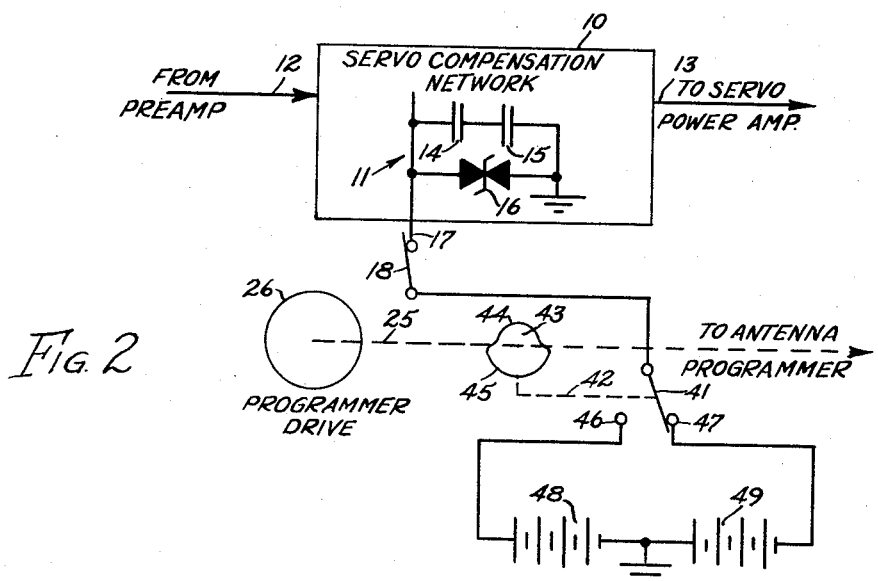

These and other objects and the attendant advantages of this invention will become more apparent to those skilled in the art as the description proceeds when taken in conjunction with the accompanying drawing in which:

FIGURE 1 illustrates in circuit schematic and block diagrammatic form one modification of the invention, and FIGURE 2 shows in circuit schematic and block diagrammatic form another modification of the invention.

Referring more particularly to FIGURE 1 there is shown a servo compensation network 10 which ordinarily includes a lag-lead capacitor component 11 therein to compensate for the searching and tracking errors. The network 10 is adapted to be coupled in a search-track radar antenna servo system by having a signal input from a preamplifier lead 12 with an output 13 to the servo power amplifier of the servo system. The capacitor component 11 may consist of a pair of capacitors 14 and 15 in series, these series capacitors being in parallel to a double Zener diode 16 which limits the voltage across the capacitors reducing the recovery time and overshoots for large transient signals. While the capacitor component 11 is shown as consisting of two capacitors in series, it is to be understood that any combined number may be used to provide the desired capacity. The capacitor means 11 of the servo compensation network 10 is coupled by a conductor means 17 through a mode switch 18 to the common terminals of switches 19 and 20. The switch blades of the switches 19 and 20 are each actuated through cam follower means 21 and 22 in a slidable engagement with the cam surfaces of cam wheels 23 and 24, respectively. The cam wheels 23 and 24 are driven through shaft means 25 from the shaft of a programmer drive motor 26, which shaft means 25 likewise drives the antenna programmer of a radar system (not shown). This programmer drive motor 26 may use a gear reduction means in the shaft means 25 as required for specific applications, the shaft means 25 normally driving a cam wheel (not shown) in the antenna programmer to produce antenna scan oscillations as is well understood in the search-track radar antenna systems art.

The switch blades of the switches 19 and 20 are each coupled through respective rectifying diodes 30 and 31, the cathode of the diode 30 and the anode of the diode 31 being coupled to a common terminal 32. The terminal 32 of the diodes 30 and 31 is coupled through a current limiting resistor 33 to the secondary winding 34 of a transformer 35. The primary winding of transformer 35 is adapted to be coupled by terminals 36 and 37 to an alternating current voltage source. The opposite lead of the secondary winding 34 is coupled directly to ground. The anode of the rectifying diode 30 is coupled through a resistor 38 to ground, and the cathode of the rectifying diode 31 is coupled through a resistor 39 to ground. The resistors 33, 38, and 39 are selected to produce an internal switch resistance to provide the desired charge and discharge time constant of the lead-lag capacitors 14 and 15 of the servo compensating network 10. Cam lobes 23' and 24' are positioned on cam wheels 23 and 24 to close the switches 19 and 20, respectively, as the antenna moves to each of its extreme scanning limits. Preferably, the cams 23' and 24' are in diametrically opposite positions whereby switches 19 and 20, respectively, will close for a brief period of .12 to .15 second at the antenna scan limits. It may be understood that cam lobes 23' and 24' may be arranged in any angular spacial relation so long as switches 19 and 20 have corresponding positions to be actuated at the proper moment of the antenna scan limiting positions. It is also to be understood that the switch blades of the switches 19 and 20 may have separate sources of direct current of opposite polarity applied thereto in substitution for the rectified alternating current shown herein.

Referring more particularly to FIGURE 2, where like parts have like reference characters, the input conductor 17 to the servo compensating lead-lag capacitor means 11 through the mode switch 18 is from a single-pole-double-throw switch 41. The switch blade of the switch 41 is actuated by cam follower 42 in cam following engagement with a cam wheel 43 driven by the shaft 25 of the programmer drive motor 26. The cam wheel 43 has a node portion 44 for substantially 180 degrees and a lobe portion 45 for substantially the other 180 degrees of the cam surface to throw the switch blade of the switch 41 alternately to the switch contacts 46 and 47. The direct current sources 48 or 49 will apply positive and negative voltage alternately to the lag-lead capacitor means 11 of the servo compensation network 10 to discharge the capacitor means of the voltage representative of the error of one antenna oscillatory direction and to charge same to the voltage representative of the signal of the other oscillatory direction, the applied voltage being maintained during the scan of the antenna in its one or other direction to reduce the transient and velocity errors produced by the change in antenna oscillatory direction to substantially zero. As illustrated herein, the switch contact 46 has a positive direct current voltage applied thereto from a battery 48 while the switch contact 47 has a negative direct current voltage applied thereto from a battery 49 to apply these voltages to the lag-lead capacitor means 11 in support of the voltages applied from the preamplifier 12 signaling the oscillatory antenna direction voltages to the servo system.

Operation

In the operation of the switch mechanism as illustrated herein, let it be assumed that the shaft 25 of the servo drive motor 26 is coupled to drive an antenna in an oscillatory motion of scan which is constructed and arranged to be driven to one limit of scanning motion at the precise time that one of the cam lobes, for example, cam lobe of 23' of cam wheel 23 in FIG. 1 actuates the cam follower 21 to close the switch 19 momentarily. Likewise, when the antenna, in its oscillatory motion, is driven to its other limit of scan, the cam lobe 24' on cam wheel 24 is rotated to the position of actuating the cam follower 22 to close the switch 20 momentarily. Under the condition when switch 19 is momentarily closed, it being assumed that the mode switch 18 is closed, a negative direct current voltage is applied to the lead-lag capacitors 14 and 15 of the servo compensation network 10 to rapidly charge same to a negative voltage representative of the voltage signal coming through the preamplifier 12 signaling the beginning of the antenna oscillatory direction. Likewise, whenever switch 20 is closed, a positive voltage will be applied to the lead-lag capacitors 14 and 15 of the capacitor component 11 to rapidly charge same to a positive voltage representative of the voltage signaling the beginning of oscillatory direction of the antenna. Alternating current applied to the terminals 36 and 37 of the transformer 35 will be rectified by the rectifying diodes 30 and 31 to provide switches 19 and 20 with negative and positive potentials, respectively, that are alternately switchable to the lead-lag capacitor means 11. Mode switch 18 may be automatically switched by the radar mode switch (not shown) or otherwise switched to open position whenever the radar system (not shown) is changed to its tracking mode.

The switching means of FIGURES 1 and 2 are similar in certain respects of rapidly discharging the lead-lag capacitor component of the servo compensation network 10 of prior charges and of charging same to a voltage substantially equal to the voltage representative of the servo signal voltage for the oscillatory direction of the antenna. In FIG. 1 the charge and discharge voltages are applied only momentarily, for example, .12 to .15 second; while in FIG. 2 the charge and discharge voltages are applied for the corresponding time that the antenna is traversing each of its oscillatory motions. In FIG. 1 the lead-lag capacitor component is conditioned at the beginning of each antenna oscillatory motion leaving the capacitor component subject to the antenna servo signal coming from the pre-amplifier through the input 12 to the servo compensation network 10 for the remainder of the antenna half cycle of travel; while in FIG. 2 the charge and discharge voltages are applied throughout each antenna oscillatory half cycle and any deviations of the servo signal coming by way of input 12 from the applied voltage through mode switch 18 will be operative on the servo compensation network output 13 to the servo power amplifier. It is to be understood that in the search-track radar systems of the type referred to herein, the radar antenna ordinarily lags the position predicted by the programmer at any one moment which produces velocity error signals and large error transient signals at the limits of antenna oscillation where the servo signals change from positive to negative, or negative to positive, as appropriate. The programmed switching circuit, synchronized with the antenna program of oscillation substantially eliminates or compensates for these velocity and transient errors.

While many modifications and changes may be made in the constructional details and circuit arrangement of this invention without departing from the intent and purposes of this invention, it is to be understood that applicant desires to be limited only by the scope of the appended claim.

I claim:

A means for alternately charging and recharging in opposite polarity a servo capacitor means in a servo compensation network in synchronism with radar antenna scanning operation comprising:

switch means having alternately switchable positions from two inputs to a single output;

servo capacitive means in said compensation network having one plate means coupled to said switch means single output and the other plate means coupled to a fixed potential;

voltage supply means of alternating current voltage having one lead output coupled to said fixed potential and having another lead output coupled to one of said two switch inputs through a rectifier polarized in one direction and coupled to the other of said two switch inputs through a rectifier polarized in the other direction to supply said one of said two switch inputs with voltage of one polarity and the other of said two switch inputs with voltage of the opposite polarity;

a resistance means coupled between each of said one and said other of said two switch inputs, respectively, and said fixed potential to establish optimal charging time constants for said servo capacitive means; and driving means having a cam means driven thereby with a cam follower switch actuating means operative to alternately switch said switch means to its alternate switch positions to alternately charge and recharge said servo capacitive means to potentials of opposite polarity from said fixed potential at preselected times with respect to predetermined limit positions whereby the reversing transient errors and velocity errors of an antenna scanning operation are minimized.

References Cited by the Examiner

UNITED STATES PATENTS

| | | | |
|---|---|---|---|
| 2,478,906 | 8/49 | Edgerton | 320—1 |
| 2,836,735 | 5/58 | Kreutzer | 307—110 |
| 3,013,247 | 12/61 | Kietz | 320—1 X |

IRVING L. SRAGOW, *Primary Examiner*.

ORIS L. RADER, *Examiner*.